United States Patent
Lee et al.

(10) Patent No.: US 12,418,424 B2
(45) Date of Patent: Sep. 16, 2025

(54) METHOD AND APPARATUS FOR SETTING REGISTRATION BETWEEN IOT CONTROLLER AND IOT CONTROLEE ON BASIS OF C2C CONNECTION IN WIRELESS LAN SYSTEM OF SMART HOME ENVIRONMENT

(71) Applicant: LG ELECTRONICS INC., Seoul (KR)

(72) Inventors: Byungjoo Lee, Seoul (KR); Jeonghwan Kim, Seoul (KR); Youngjun Jo, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 196 days.

(21) Appl. No.: 18/038,426

(22) PCT Filed: Nov. 25, 2021

(86) PCT No.: PCT/KR2021/017482
§ 371 (c)(1),
(2) Date: May 23, 2023

(87) PCT Pub. No.: WO2022/124652
PCT Pub. Date: Jun. 16, 2022

(65) Prior Publication Data
US 2024/0097901 A1    Mar. 21, 2024

(30) Foreign Application Priority Data
Dec. 10, 2020   (KR) .................. 10-2020-0172676

(51) Int. Cl.
*H04L 9/32* (2006.01)
*H04L 9/40* (2022.01)
(Continued)

(52) U.S. Cl.
CPC .............. *H04L 9/3271* (2013.01); *H04L 9/32* (2013.01); *H04L 63/0846* (2013.01);
(Continued)

(58) Field of Classification Search
CPC ..... H04L 9/3271; H04L 9/32; H04L 63/0846; H04W 12/63; H04W 12/068; H04W 12/71; H04W 4/80
See application file for complete search history.

(56) References Cited

U.S. PATENT DOCUMENTS

| 10,638,417 | B1 * | 4/2020 | Baki | ..................... H04W 48/16 |
| 2015/0256391 | A1 * | 9/2015 | Hardy | .................. H04L 41/5054 |
| | | | | 709/222 |

(Continued)

FOREIGN PATENT DOCUMENTS

| KR | 1020150122199 | 10/2015 |
| KR | 1020160146346 | 12/2016 |
| KR | 1020200098561 | 8/2020 |

OTHER PUBLICATIONS

PCT International Application No. PCT/KR2021/017482, International Search Report dated Feb. 25, 2023, 3 pages.

*Primary Examiner* — Robert B Leung
(74) *Attorney, Agent, or Firm* — LEE, HONG, DEGERMAN, KANG & WAIMEY

(57) ABSTRACT

Proposed are a method and an apparatus for setting the registration between an IoT controller and IoT controlee on the basis of a C2C connection in a wireless LAN system of a smart home environment. Particularly, the controlee receives detection information about the controlee from the controller. The controlee transmits a challenge request message for requesting the first information from the controller. The controlee receives a challenge response message includ- (Continued)

ing the first information from the controller. The controlee transmits a challenge confirm message to the controller.

14 Claims, 12 Drawing Sheets

(51) Int. Cl.
*H04W 4/80* (2018.01)
*H04W 12/06* (2021.01)
*H04W 12/63* (2021.01)
*H04W 12/71* (2021.01)

(52) U.S. Cl.
CPC .............. *H04W 12/63* (2021.01); *H04W 4/80* (2018.02); *H04W 12/068* (2021.01); *H04W 12/71* (2021.01)

(56) References Cited

U.S. PATENT DOCUMENTS

| | | | |
|---|---|---|---|
| 2016/0156614 A1 | 6/2016 | Jain et al. | |
| 2018/0159855 A1* | 6/2018 | Ha | H04W 12/068 |
| 2019/0364096 A1 | 11/2019 | Li | |
| 2020/0169549 A1* | 5/2020 | Smith | H04L 63/101 |
| 2020/0287905 A1* | 9/2020 | Milburn | G06Q 20/28 |
| 2020/0336895 A1* | 10/2020 | Bartlett | H04L 9/3247 |
| 2021/0314770 A1* | 10/2021 | Barr | H04W 4/80 |
| 2022/0012318 A1* | 1/2022 | Battle | H04L 63/0861 |
| 2022/0060560 A1* | 2/2022 | Zhang | H04L 67/51 |

* cited by examiner (a)

(b)

METHOD AND APPARATUS FOR SETTING REGISTRATION BETWEEN IOT CONTROLLER AND IOT CONTROLEE ON BASIS OF C2C CONNECTION IN WIRELESS LAN SYSTEM OF SMART HOME ENVIRONMENT

CROSS-REFERENCE TO RELATED APPLICATION(S)

This application is the National Stage filing under 35 U.S.C. 371 of International Application No. PCT/KR2021/017482, filed on Nov. 25, 2021, which claims the benefit of earlier filing date and right of priority to Korean Application No. 10-2020-0172676, filed on Dec. 10, 2020, the contents of which are all incorporated by reference herein in their entirety.

TECHNICAL FIELD

The present specification relates to a method for setting IoT devices in a wireless LAN system in a smart home environment, and more particularly, to a method and apparatus for setting an IoT device in a wireless LAN system of a smart home environment, and more particularly, to a method and apparatus for setting commissioning between an IoT controller and an IoT controlee based on a C2C connection.

BACKGROUND

Amazon, Apple, Google and the Zigbee Alliance today announced a new joint working group to advance the development and adoption of a new, royalty-free connectivity standard that increases compatibility among smart home products and embeds security into fundamental design principles. IKEA, Legrand, NXP Semiconductors, Resideo, Samsung SmartThings, Schneider Electric, Signify (Philips Hue), Silicon Labs, Somfy, Wuhan, and ThinQ (LG Electronics) etc., which constitute the board of directors of the Zigbee Alliance will also join the joint committee and contribute to the project toward a common goal.

The goal of the Connected Home over IP project is to simplify development for manufacturers and increase compatibility for consumers. The project is based on the common belief that smart home devices must ensure security, stability and seamless usability. The project aims to enable communication between smart home devices, mobile apps, and cloud services based on the Internet Protocol (IP), and to define a set of specific IP-based networking technologies for device authentication.

An industry joint committee adopts an open source approach in the development and implementation of new integrated connectivity protocols. The project will utilize market-proven smart home technologies from Amazon, Apple, Google, and the Zigbee Alliance. The decision to leverage these technologies is expected to accelerate the protocol development process and deliver benefits quickly to manufacturers and consumers.

The project aims to simplify the creation of devices compatible with smart homes and voice-recognition services such as Amazon's Alexa, Apple's Sin, and Google's Assistant for device makers. The forthcoming protocol will complement existing technologies, and the Joint Committee members encourage device manufacturers to continue to pursue innovations based on existing technologies.

The Connected Home over IP project encourages device manufacturers, silicon providers and developers in the smart home industry to participate in and contribute to standards development.

SUMMARY

This specification proposes a method and apparatus for setting commissioning between an IoT controller and an IoT controlee based on a C2C connection in a wireless LAN system in a smart home environment.

An example of the present specification proposes a method for setting commissioning between an IoT controller and an IoT controlee based on a C2C connection.

This embodiment proposes a method for setting commissioning in local between an IoT controller and an IoT controlee through a cloud-to-cloud (C2C) connection in a smart home environment. To this end, the user performs a proof-of-possession procedure to confirm that the IoT controlee physically belongs to the user. According to the proof-of-possession procedure, the IoT controller can confirm the local presence of the IoT controlee and prevent commissioning of neighboring devices or non-local devices that are searched through BLE. A controller described later may correspond to the IoT controller, and a controlee may correspond to the IoT controlee.

A controlee receives detection information of the controlee from a controller.

The controlee transmits a challenge request message requesting first information to the controller.

The controlee receives a challenge response message including the first information from the controller.

The controlee transmits a challenge confirm message to the controller.

The controlee is connected to the first cloud based on a first account, and the controller is connected to a second cloud based on a second account.

The detection information of the controlee, the challenge request message, the challenge response message, and the challenge confirmation message are transmitted and received based on the connection between the first and second clouds. That is, the information and message may be transmitted and received through a C2C connection (connection between the first cloud of the controlee and the second cloud of the controller) for commissioning between the controlee and the controller.

The first information is a proof of possession value. The challenge confirmation message includes a verification result of the commissioning between the controlee and the controller based on the first information.

According to the embodiment proposed in this specification, the user performs a proof-of-possession procedure for confirming that the IoT controlee physically belongs to the user. According to the proof-of-possession procedure, there is an effect that the IoT controller can check the local presence of the IoT controlee and prevent commissioning of neighboring devices or non-local devices that are searched through BLE.

DETAILED DESCRIPTION

Figure 1:
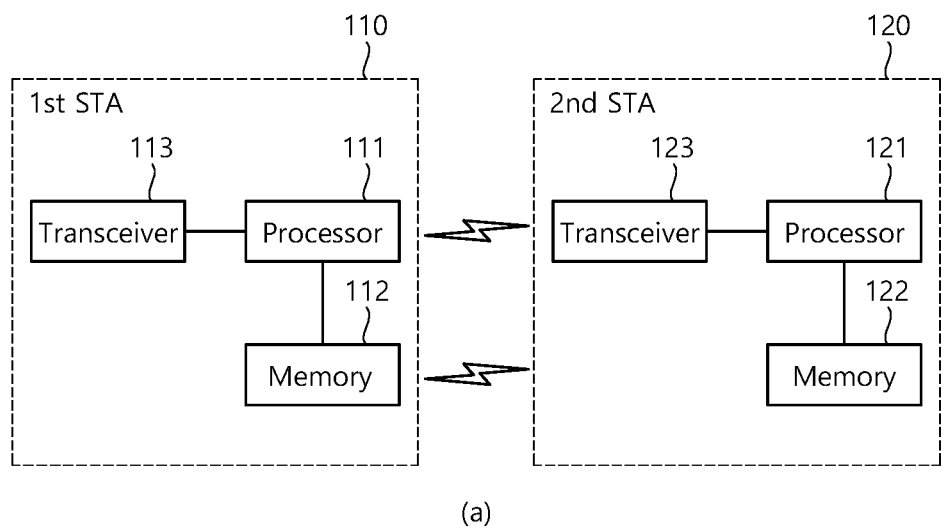
FIG. 1 shows an example of a transmitting apparatus and/or receiving apparatus of the present specification.
Figure 1:
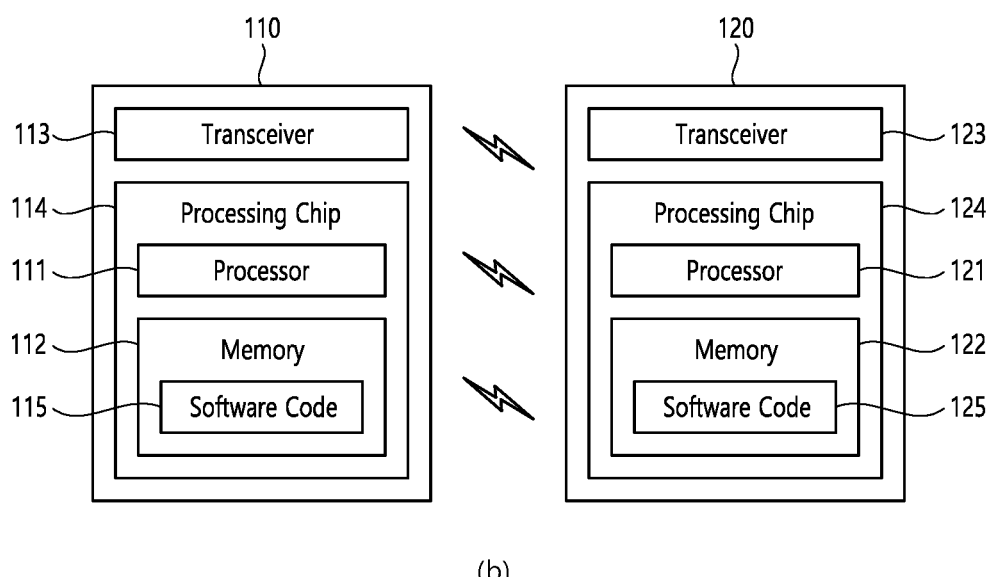

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
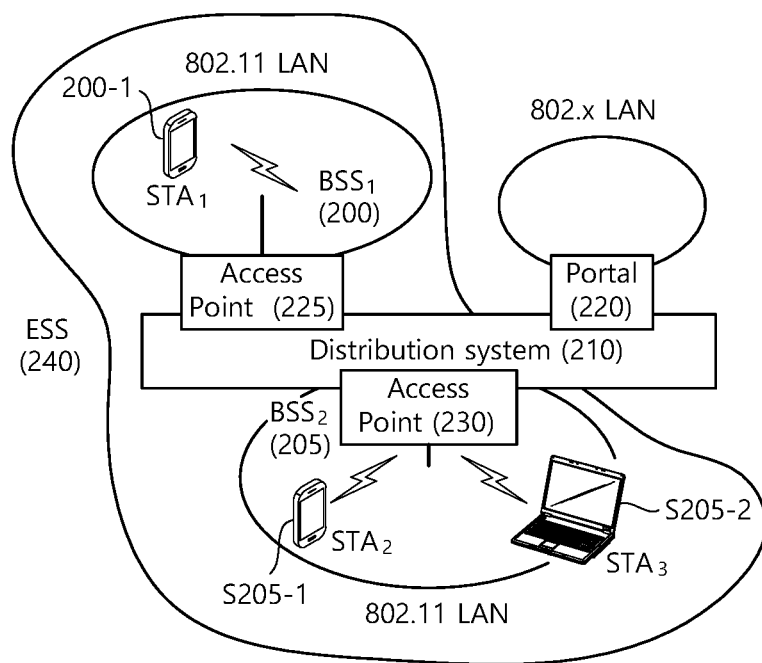
FIG. 2 is a conceptual view illustrating the structure of a wireless local area network (WLAN).
Figure 2:
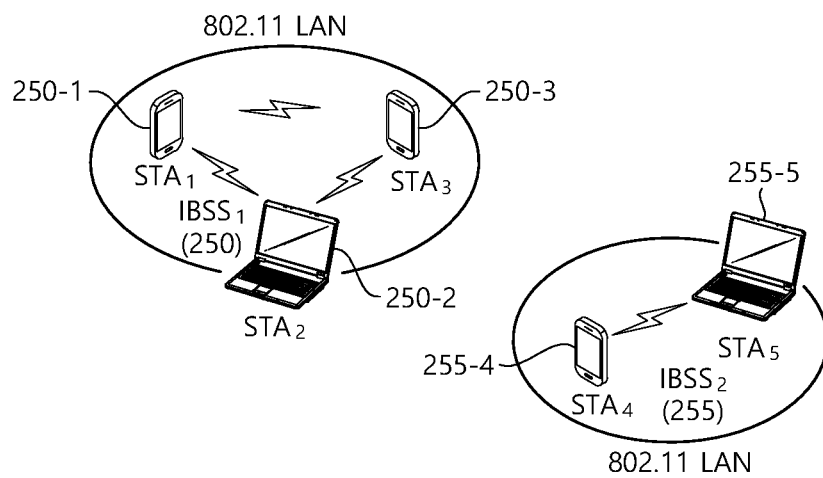

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
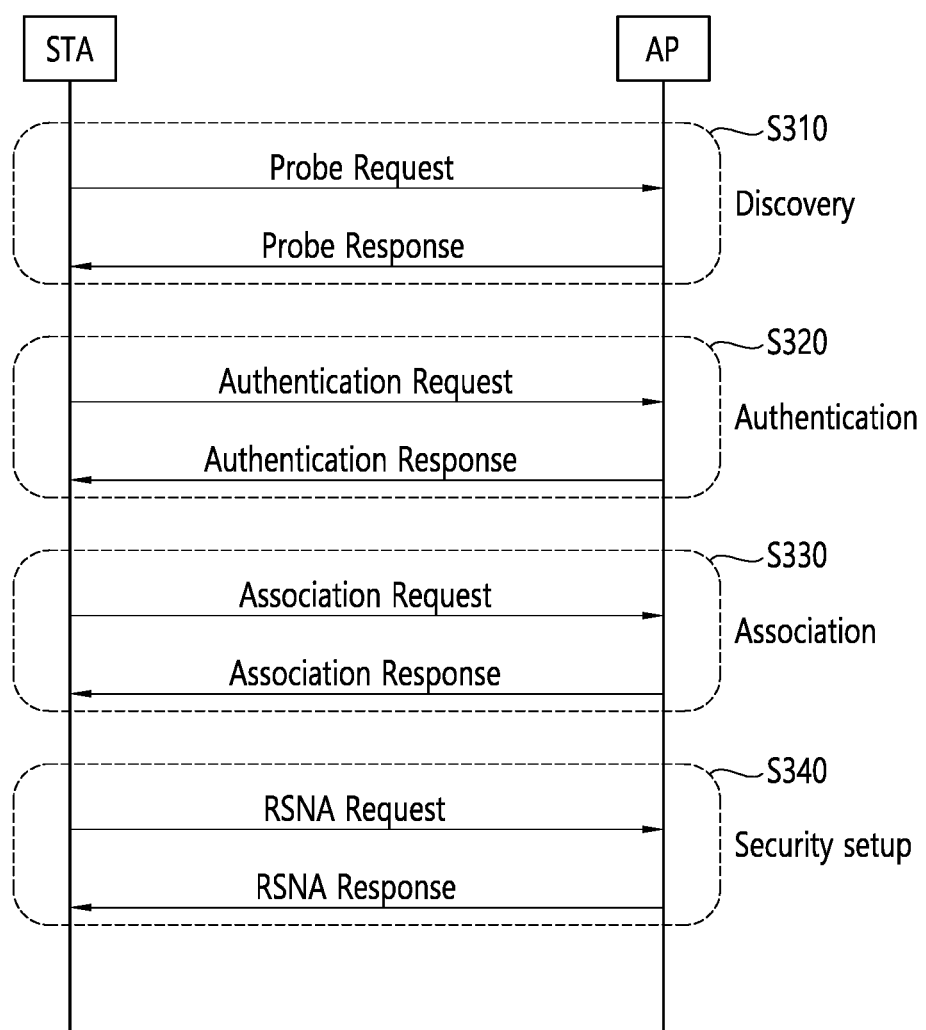
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

1. Zigbee and Connected Home Over IP (CHIP)

<Necessity of Zigbee>

Currently, there are standards for data such as voice, PC LANs, and video, but there are no wireless network standards to meet the specific needs of sensors or control devices. Sensors and control devices do not require high frequency bandwidth, but require short latency and low energy consumption for long battery life and a wide array of devices.

Today, various wireless communication systems that do not require high data rates and can operate at low cost and with low power consumption are being produced.

Products produced in this way are manufactured without standards, and eventually these past products cause compatibility problems with each product, as well as compatibility with new technologies.

<About Zigbee>

ZigBee is a high-level communication protocol using small, low-power digital radios based on IEEE 802.15.4-2003. IEEE 802.15.4-2003 is a standard for short-range personal wireless communication networks such as lamps, electronic meters, and consumer electronics that use short-range radio frequencies. ZigBee is mainly used in RF (Radio Frequency) applications that require low data rates, low battery consumption, and network safety.

<Features of Zigbee>

1) Low power consumption, simple implementation
2) Can be used for months or years on a single battery charge
3) It has an active mode (receive, transmit) and a sleep mode.
4) Device, installation, maintenance, etc. are all possible at relatively low cost
5) Safety (Security)
6) Reliability
7) Flexibility
8) Very small protocol stack
9) Interoperable and usable anywhere
10) High node density per network (ZigBee's use of IEEE 802.15.4 makes it possible to handle many devices in a network. This feature allows for massive sensor arrays and network control)
11) Simple protocol, implemented internationally (The size of the ZigBee protocol stack code is only about a quarter of the size of Bluetooth or 802.11.)

<Fields of Use of Zigbee>

Zigbee is currently used in fields such as industrial control, embedded sensors, medical data collection, fire and theft, building automation, and home automation.

1) Smart Energy
    Smart Energy provides utilities/energy service providers with a secure and easy-to-use home wireless network to manage energy. Smart Energy gives utilities/energy service providers or their customers direct control of thermostats or other associated devices.
2) Home Entertainment and Control
    Smart power, advanced temperature control system, safety and security, movies and music
3) Home Recognition System
    Water temperature sensor, power sensor, energy monitoring, fire and theft monitoring, smart devices and access sensors
4) Mobile Service
    Mobile payment, mobile monitoring and control, mobile security and access control, mobile healthcare and remote support
5) Commercial Buildings
    Energy monitoring, air conditioning, lighting, access control
6) Industrial Factories
    Process control, material management, environment management, energy management, industrial device control, M2M communication <Zigbee Device Type>

Figure 4:
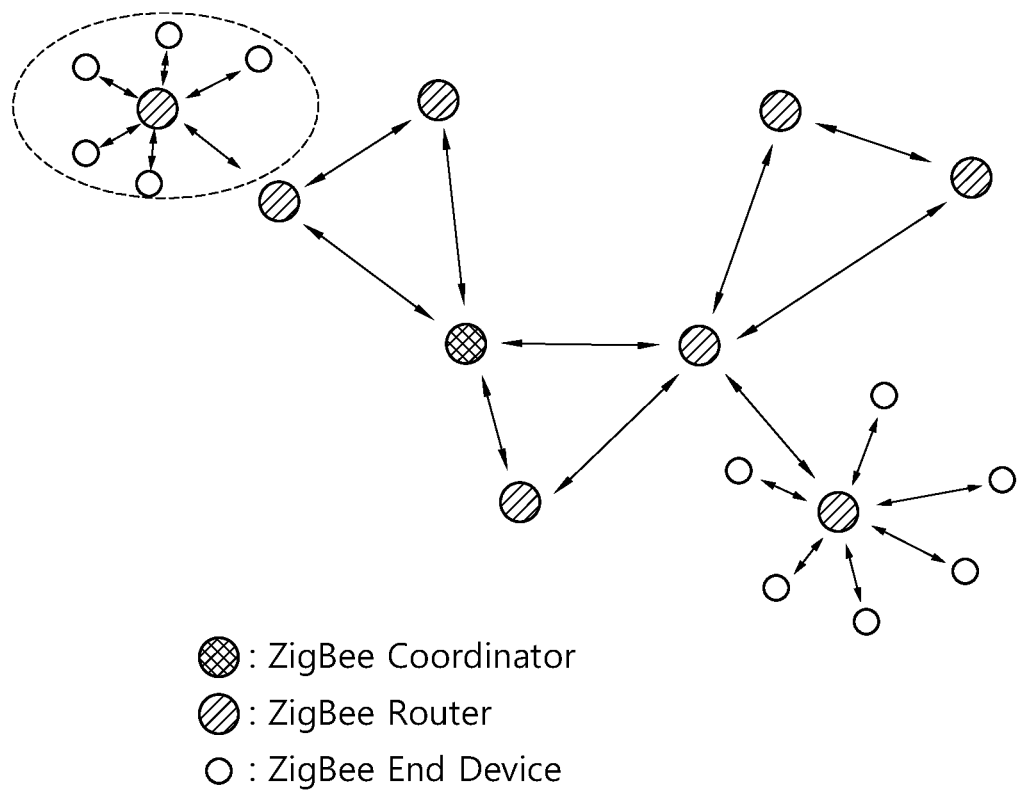
FIG. 4 shows Zigbee device types.

FIG. 4 shows Zigbee device types.

There are three types of Zigbee devices as shown in FIG. 4.

1) Zigbee Coordinator
    It forms a network with the most important devices and connects them to other networks. Each network has only one coordinator. The ZigBee coordinator can store information about the network and also serves as a trust center or storage for security keys.

2) Zigbee Router

A router can function not only as an application function, but also as a writer that can forward data from other devices.

3) Zigbee End Device

ZigBee end devices include the ability to communicate with parent nodes. This relationship allows the node to wait a long time, extending battery life even further.

<Zigbee Stack>

Figure 5:
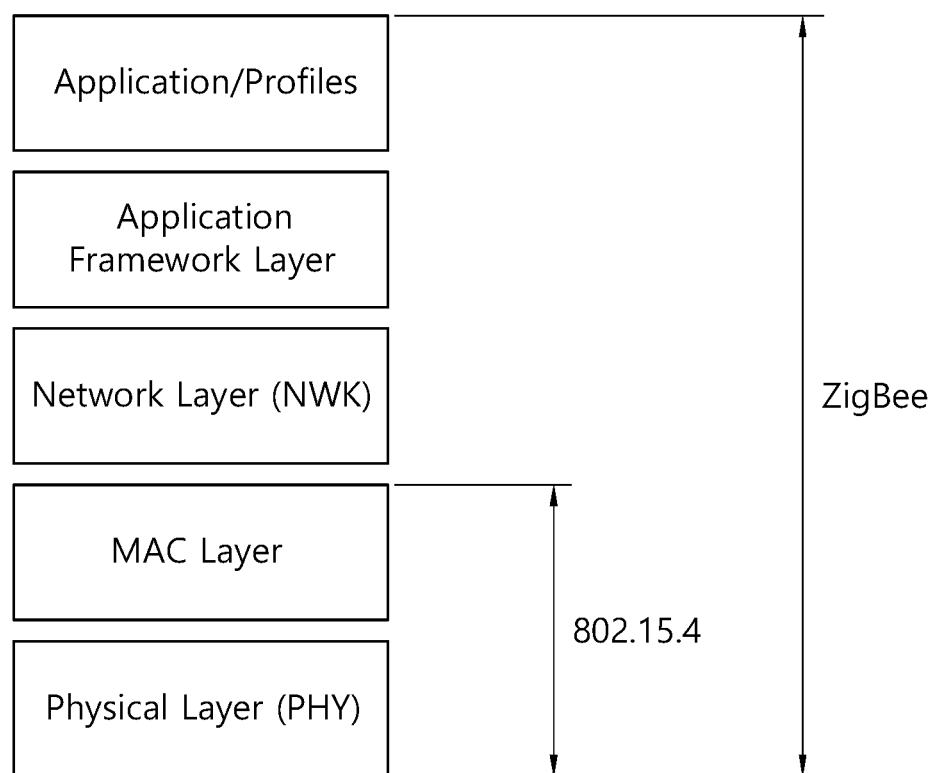
FIG. 5 shows a Zigbee stack.

FIG. 5 shows a Zigbee stack.

Zigbee is simpler than many other protocol stacks, and the Zigbee stack code size is small compared to other protocols. MAC and PHY are defined by the IEEE 802.15.4 standard. Network and application layers are defined by the Zigbee Alliance and the actual application provided by equipment designers.

802.15.4 is a simple packet data protocol for lightweight wireless networks. 802.15.4 was created to monitor and control applications where battery life is critical. 802.15.4 is at the root of ZigBee's excellent battery life.

802.15.4 can apply both IEEE long/short addressing. Short addressing is used for network management where network IDs are provisionally determined. This makes it less costly, but still enables use of around 65,000 network nodes.

In addition, 802.15.4 enables reliable data transmission and beacon management.

The network layer ensures proper operation of the MAC layer and provides an interface to the application layer. The network layer supports star, tree, and mesh topologies. The network layer is where networks are started, joined, destroyed, and retrieved.

The network layer is responsible for routing and security.

The application framework is an execution environment in which application objects can send and receive data. The application object is determined by the manufacturer of the Zigbee device. As defined by Zigbee, the application object is located at the top of the application layer and is determined by the device manufacturer. The application object actually builds the application; This could be a light bulb, light switch, LED, I/O line, etc.

Looking at home appliances released these days, the modifier 'smart' is almost mandatory. It is difficult to find products that are not 'smart', such as smart TVs, smart refrigerators, smart air conditioners, and smart washing machines. These smart products implement various convenience functions based on IoT (Internet Of Things) technology, which is equipped with wired and wireless networks, communicates closely with each other, and interlocks with each other. If you combine various sensors with IoT technology, such as temperature and humidity sensors, door sensors, motion sensors, and IP cameras, you can use more precise and diverse automation functions.

When a number of these smart products are gathered and applied to one house, a 'smart home' is born. If you live in such a home, you can use a variety of automated or remote functions, such as automatically turning on lights or air conditioners when you are ready to go home from outside work, and automatically playing appropriate music depending on the day's weather. Other similar concepts include 'smart building' and 'smart factory'.

However, there are side effects caused by the proliferation of smart products and the proliferation of products of various standards. It's just a compatibility issue. The core of IoT technology is communication and linkage between devices, and if each device uses a different IoT platform and does not link with each other, its usability is greatly reduced.

For example, if the speaker is a product based on the 'Apple HomePod' platform, but the TV is only compatible with the 'Samsung SmartThings' platform, you may not be able to use the function of turning on the TV or switching channels through voice commands. Of course, recently, one product supports two or more IoT platforms at the same time. Or, there is a way to decorate a smart environment by purchasing all products only based on the same platform. But even so, it is inconvenient to have to carefully check compatibility every time you buy a product.

But in the future you won't have to worry about that. This is because major IoT-related companies have gathered and announced standard specifications that enable all devices to be compatible without platform dependency. In May, the CSA (Connectivity Standards Alliance) standards association introduced an IoT standard protocol called 'Matter'. Formerly known as Project CHIP (Connected Home over IP), the Matter standard is being supported by Amazon, Google, Signify (Philips Hue), SmartThings, and other major players in the smart home market.

There are dozens of companies that have participated in or announced cooperation in establishing Matter standards, including Samsung Electronics, Google, Amazon, Apple, Tuya, Huawei, and Schneider Electric, all of which are global companies with a high share in the IoT market. If the Matter standard spreads widely, all smart devices will now work seamlessly without having to worry about manufacturers or platforms.

Matter is an IP-based protocol that can run over existing network technologies such as Wi-Fi, Ethernet, and Thread. The federation said Matter devices can be easily set up using Bluetooth Low Energy (BLE). It is explained that users do not have to do complicated configuration work because smart home devices can inform each other of their identity and possible operations.

In particular, Matter's 'multi-admin' feature allows products from various ecosystems, such as Apple HomeKit and Amazon Alexa, to work together without complicated work by end users. Multi-Manager also sets up layers of control to help different family members connect to smart appliances in the home with different levels of control.

Figure 6:
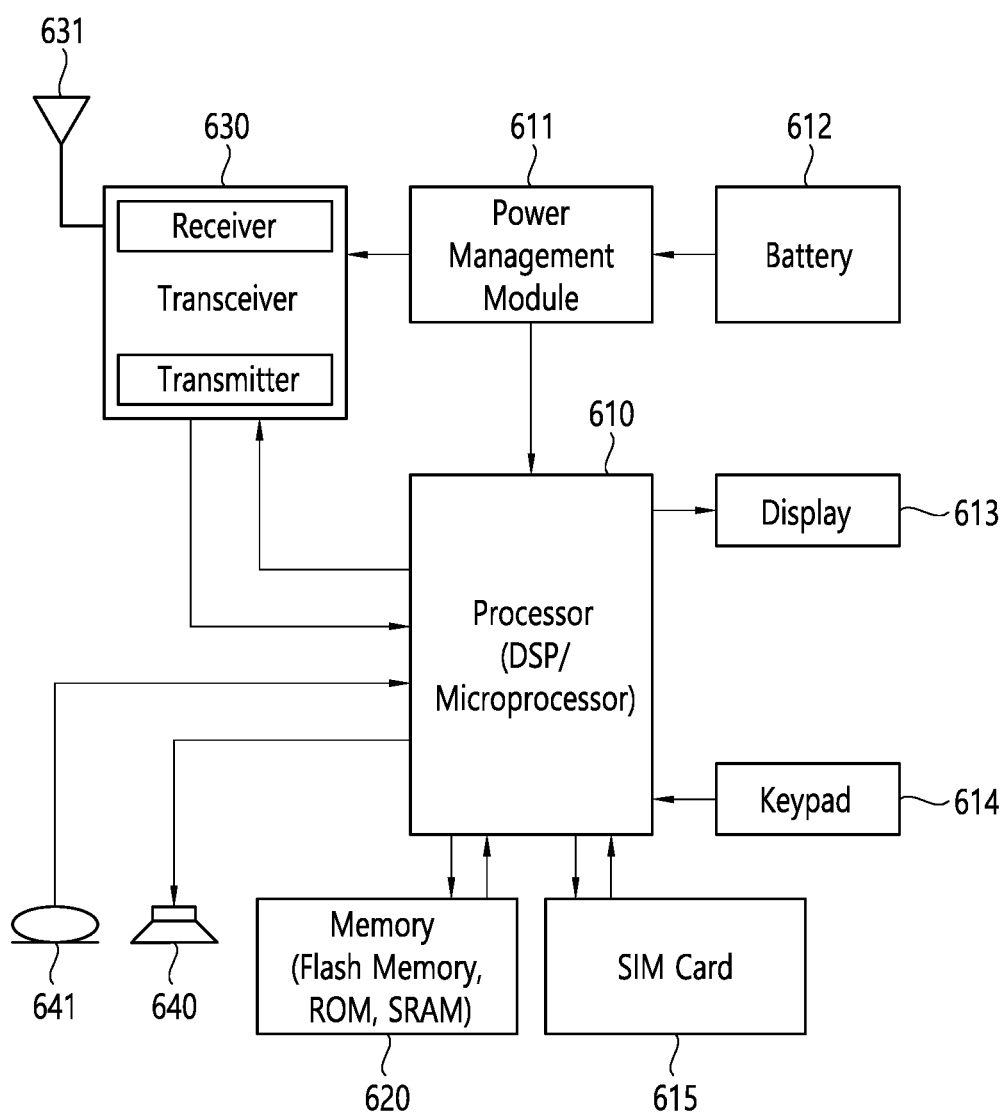
FIG. 6 shows a modified example of the transmitting device and/or the receiving device of the present specification.

FIG. 6 shows a modified example of the transmitting device and/or the receiving device of the present specification.

Each device/STA of the sub-figure (a)/(b) of FIG. 1 may be modified as shown in FIG. 6. A transceiver 630 of FIG. 6 may be identical to the transceivers 113 and 123 of FIG. 1. The transceiver 630 of FIG. 6 may include a receiver and a transmitter.

A processor 610 of FIG. 6 may be identical to the processors 111 and 121 of FIG. 1. Alternatively, the processor 610 of FIG. 6 may be identical to the processing chips 114 and 124 of FIG. 1.

A memory 620 of FIG. 6 may be identical to the memories 112 and 122 of FIG. 1. Alternatively, the memory 620 of FIG. 6 may be a separate external memory different from the memories 112 and 122 of FIG. 1.

Referring to FIG. 6, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 6, a speaker 640 may output a result related to a sound processed by the processor 610. A microphone 641 may receive an input related to a sound to be used by the processor 610.

2. Embodiments Applicable to this Specification

This specification describes a method for generating information necessary for a CHIP Controlee device for commissioning of a Connected Home over IP (CHIP) device and a method for acquiring the information in a CHIP controller. In particular, this specification explains a method in which the CHIP Controller passes the value for information generation to the Cloud, and through the verification process between the Cloud of the Controlee and the Cloud of the Controller, the value required for connection is passed to the Controller, enabling device commissioning in Local between the two devices.

Conventional CHIP standard technology performs ownership commissioning of a device by scanning or directly inputting a QR (Quick Response) code or a numeric code (Manual Pairing Code) attached to a controlee device from a controller device to a camera. In this case, the device discriminator value (16 bits) and the Setup PIN (Postal Index Number) Code value (27 bits) used for device identification are encoded in the QR code. A device with a camera, such as a smartphone, reads this through QR scan, allowing the controller to retrieve the value. Alternatively, a numeric code (11-digit or 21-digit number) besides the QR is displayed on the controlee, and the corresponding code is entered through the input device of the controller to perform device commissioning through the corresponding value.

In order to input the QR code or PIN code described above, the controller device must have a camera device for scanning the QR or a keypad for entering numbers. Also, in the case of a numeric code, since the length of information is long, the user must directly input an 11-digit or 21-digit number, which may cause a bad user experience or an error during input. In addition, depending on the type of controlee device, there is a case where the value of the QR Code or the numeric code cannot be changed, so there is a security threat of device commissioning.

In this specification, the method for acquiring the Setup PIN Code required for device registration by obtaining the value (seed value) for the Controlee to generate the value required for device commissioning included in the QR or numeric code, and by delivering to Cloud of Controlee manufacturer by the controller is described. By using a shorter numeric code than before for Proof of Possession to confirm the actual existence of the device, this embodiment describes a device without a camera or a method for commissioning a corresponding device with voice without QR or input of long numbers.

2.1. Environment for Technology Application

Figure 7:
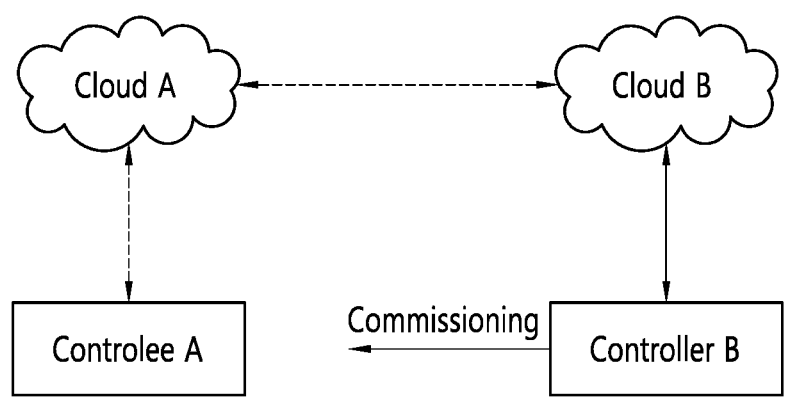
FIG. 7 shows a connection structure between a controller and a controlee connected to each cloud.

FIG. 7 shows a connection structure between a controller and a controlee connected to each cloud.

The environment proposed in this specification is an environment in which the Controlee of manufacturer A and the controller of manufacturer B perform initial device commissioning as shown in FIG. 7. In this embodiment, the case where manufacturer A and manufacturer B are different manufacturers is exemplified, but is not limited thereto and is equally applicable even when the controlee and the controller are the same manufacturer.

Controller B is connected to Cloud B based on the account, and Controlee A is in the state before connecting to Cloud A. That is, Controlee A is an example of a new product and is not yet connected to the Internet or Wi-Fi. Controller B's account connected to Cloud B may or may not have Account Linking with Cloud A's account.

2.2. Controlee Initialization Process and Search

Figure 8:
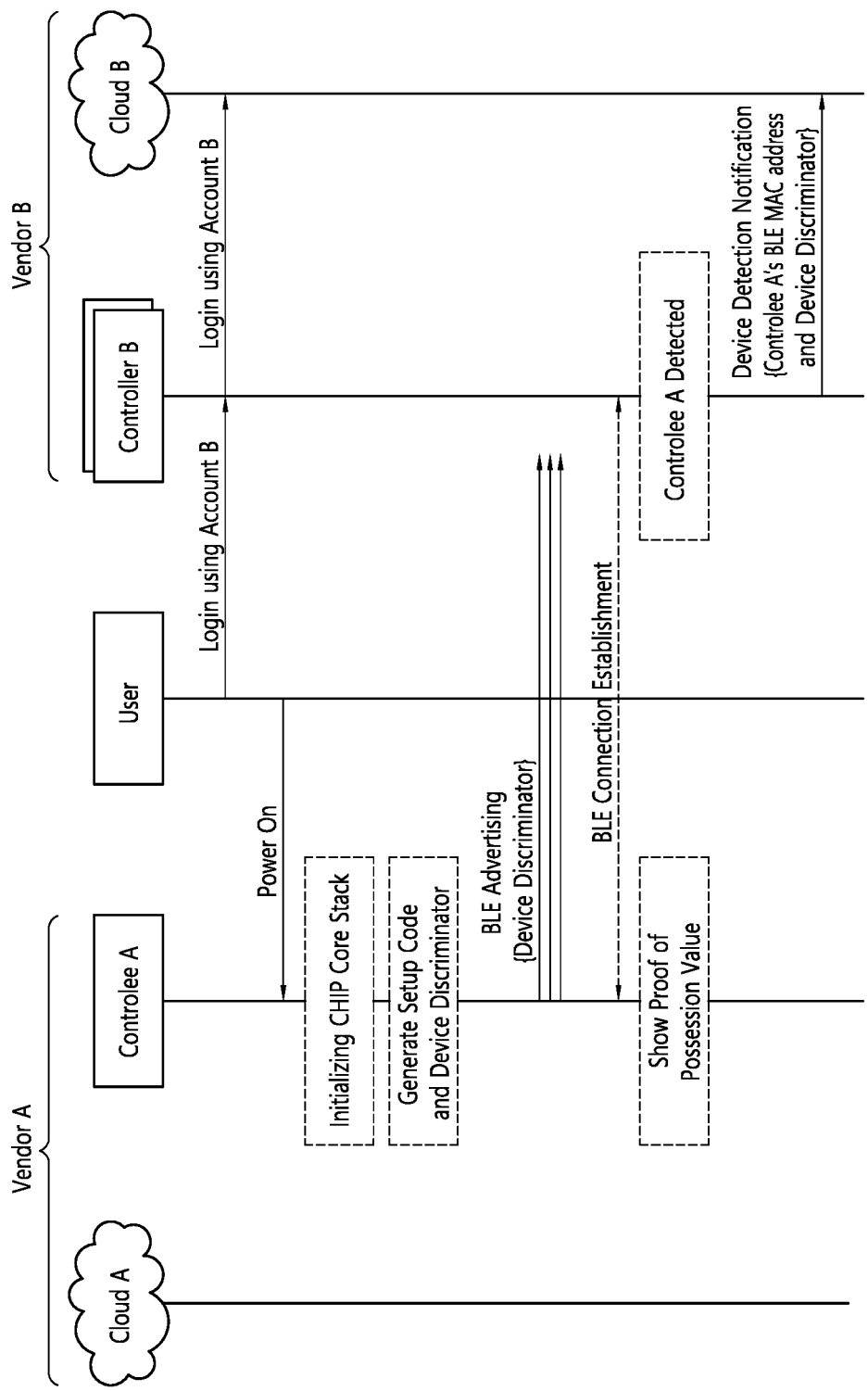
FIG. 8 shows the controlee initialization and search process procedures.

FIG. 8 shows the controlee initialization and search process procedures.

FIG. 8 is a flow chart of a procedure for a case where a user applies power to a Controlee A device.

The user lets Controller B log in to Cloud B through the account for connecting to Cloud B. The user inputs power to the new Controlee, Controlee A. Through this, Controlee A performs the initialization process. Controlee A's CHIP Stack creates values necessary for device commissioning during the initialization process. The generated values are:

Device Discriminator: Identifier to search Device (Controlee) on the network with 12-bit numeric value Rotating ID: 18 byte value, 2 byte counter value and 16 byte manufacturer-defined unique identifier of the device Setup PIN Code: This is a 27-bit numeric value used to establish a future CHIP Secure Session.

Proof of Possession Value: A numeric PIN code (ex. 4 digit number) used to confirm the presence of a user's actual device An embodiment in which Controlee creates a value required for device commissioning is as follows.

1) The controlee creates a 4-digit Device Discriminator value through Random Number Generator. Alternatively, Rotating ID (18 bytes) defined in the CHIP standard is created.

2) The controlee extracts the controlee's unique value (ex, BLE MAC address, Wi-Fi MAC address, etc.).

3) The controlee inputs the concatenated value of the Device Discriminator (or Rotating ID) value created above and the BLE MAC address as the input value of the Hash function (ex SHA256).

4) The controlee generates the output value (ex 256 bit) of the hash function.

4)-A. The controlee stores the upper 27 bits of the Hash function's output value internally to use it as the Setup PIN Code value.

4)-B. The controlee internally stores the lower bit (12 bit or 32 bit) of the output value of the Hash function as a Proof of Possession Value in the form of a number.

The controlee prepares a Bluetooth Low Energy (BLE) Advertisement based on the corresponding value. The BLE Advertisement Packet uses the packet format defined in the CHIP standard as it is, and the Device Discriminator (or Rotating ID) included in the Packet includes the previously created value.

Controller B receives the corresponding BLE Advertisement packet and knows that there is a nearby Controlee device. At this time, the MAC address of the controlee, which is the sender of the advertisement, can be checked together. Controller B notifies Cloud B of the ID of the corresponding CHIP device that it has found Controlee A (including Device Discriminator (or Rotating ID) and BLE MAC Address).

If Controlee A is a device with a screen, the Proof of Possession value (ex 4 digit number) is displayed on the screen, and the Proof of Possession process is performed by entering the corresponding number on another device.

2.3. Process of Creating an Account in the Controlee Cloud in the Controller Cloud FIG. 9 shows account creation and linking process of a cloud.

Figure 9:
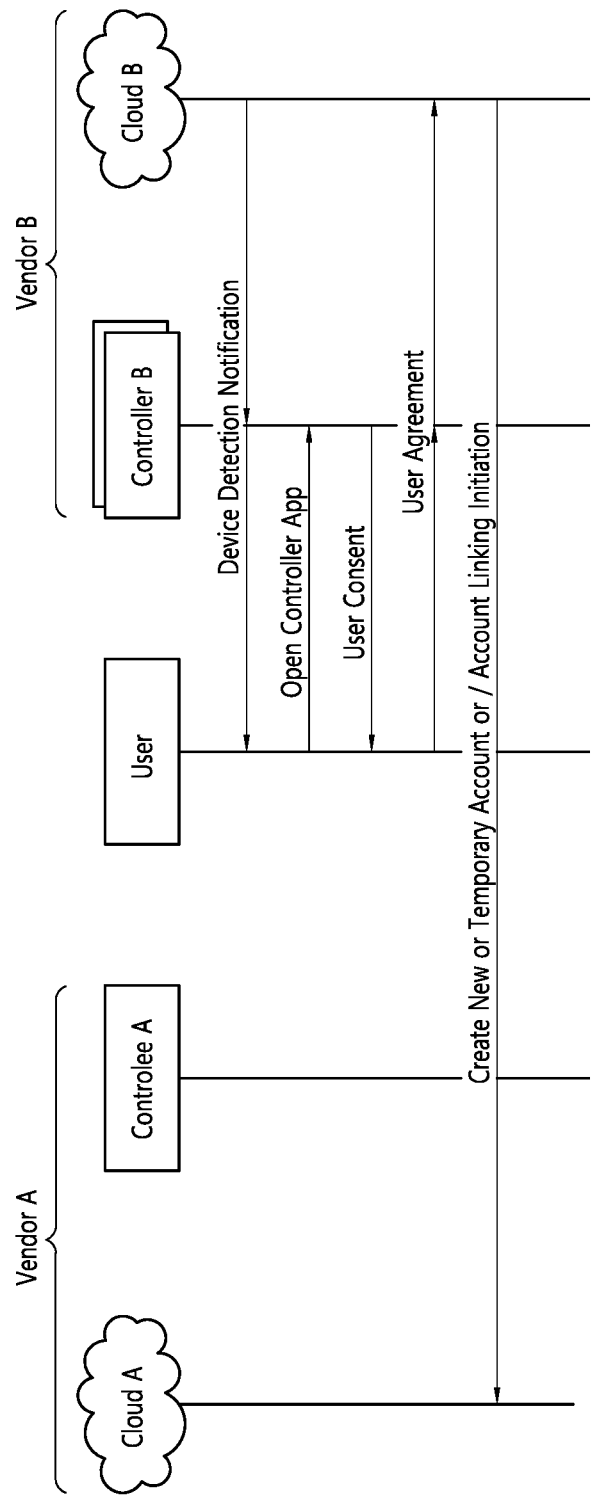
FIG. 9 shows account creation and linking process of a cloud.

FIG. 9 shows a process of informing Controller B of the result of a device search in the Controller Cloud (Cloud B)

and linking with the Controlee Cloud (Cloud A). In this embodiment, Controller B is expressed as an Application (App), but Controller B is not limited to a smartphone app and may correspond to devices such as an artificial intelligence speaker, tablet, wall pad, TV, robot, and the like.

Cloud B, the controller cloud, sends a notification to Controller B that it has found Controlee A. The user receiving this notification receives confirmation from the user whether to operate Controller B to link with Controlee A's cloud. For example, since Controlee A is found in Controller B's app, it informs the user that an account of Cloud A is required to connect Controlee A to Wi-Fi and, if necessary, confirms whether to create an account with the user. If the user agrees to this, Cloud B starts linking with Cloud A.

At this time, Cloud B can create a temporary account for Cloud A, and communication between Cloud A and Cloud B can be performed through the temporary account. In addition, if the user already has an account of Cloud A, he or she can enter the account information in the input window of Controller B to link the existing account of Cloud A with the account of Cloud B.

2.4. Proof of Possession Course

Proof of Possession is the process of confirming that a device is physically present to the user before connecting and registering the device to the network. Through this verification process, the local existence of the device is confirmed to prevent registration of neighboring devices or non-local devices that are searched through BLE. In general, between a device of the same manufacturer and an App of that manufacturer, the corresponding process is performed through a physical button, a PIN code displayed on the screen, or a locality test such as NFC tagging.

Figure 10:
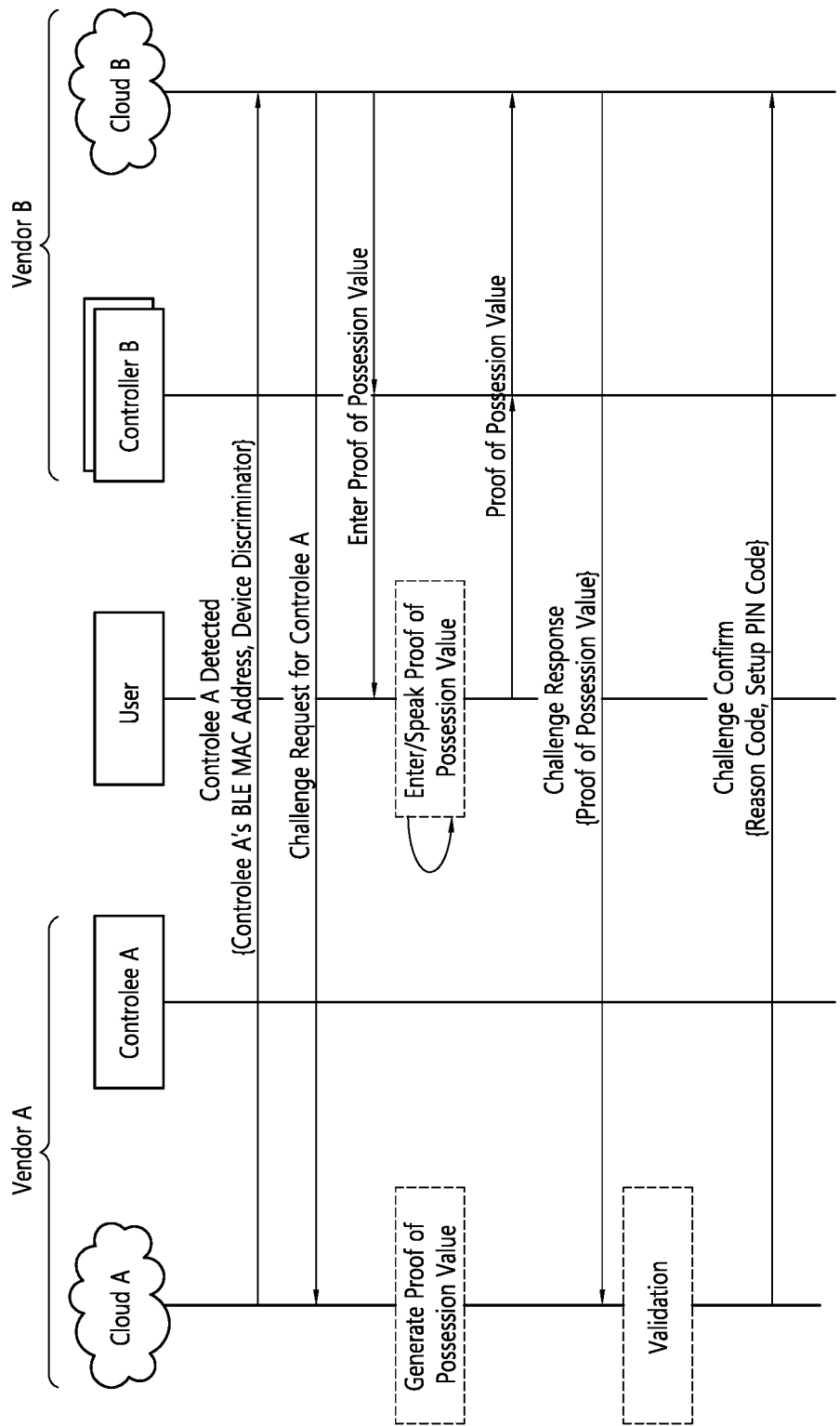
FIG. 10 shows a Proof of Possession process.

FIG. 10 shows a Proof of Possession process.

In this specification, as shown in FIG. 10, locality check is performed through the input of a short number (e.g., a 4-digit number) through a challenge request and response process between clouds. In the embodiment, Controlee A shows the Proof of Possession value generated in Section 2.2. on the Display.

Controller B notifies Cloud B that it has found the device nearby, as in Sections 2.2. and 2.3. Cloud B notifies Cloud A that it has found a device for device registration through the communication between Clouds linked in Section 2.3. At this time, the device discriminator or Rotating ID value for device identification and the BLE MAC Address of Controlee A are informed together.

Upon receiving this, Cloud A requests a Challenge Request to Cloud B through C2C (Cloud-to-Cloud) connection.

At this time, Cloud A generates the values in the following order according to the same algorithm as the Controlee generated the Setup PIN Code in Section 2.2.

An example in which Cloud A generates a value is as follows.

1) Cloud A receives Device Discriminator or Rotating ID and BLE MAC Address from Cloud B.
2) Cloud A inputs the Device Discriminator value created above or the concatenated value of Rotating ID and BLE MAC address as an input value of a hash function (ex SHA256).
3) Output value of Hash function (ex 256 bit)
3)-A. Cloud A stores the upper 27 bits of the Hash function's output value internally to use it as the Setup PIN Code value.
3)-B. Cloud A internally stores the lower bit (12 bit or 32 bit) as a Proof of Possession Value in numeric form.

The setup PIN Code and Proof of Possession Value, which are the output values of the hash function generated in this way, are exactly the same as the values generated by the previous Controlee A. Cloud A stores this value internally, and then uses it for validation of the Challenge Response received from Cloud B.

Cloud B guides Controller B to input the Proof of Possession value output to Controlee A through Controller B. At this time, if Controller B has a user input device keypad, the corresponding number is input, and in the case of a voice recognition device such as an artificial intelligence speaker or robot, the user inputs by reading the number displayed by Controlee A. Upon receiving the input, Controller B delivers the numeric value to its own Cloud B, and sends a Challenge Response message including the number input from the user from Cloud B to Cloud A.

Cloud A compares the Proof of Possession value included in the received Challenge Response message with the Proof of Possession value created immediately before. If the received value and the calculated value of Cloud A are the same, Cloud A recognizes that it has been received from the actual user of the corresponding device, and sends the Setup PIN Code for commissioning Controlee A to Cloud B as a Challenge Confirm message. If the values are different, Cloud A notifies Cloud B of the failure through a fail in the reason code.

In this embodiment, an algorithm generated through SHA256 is used for simplicity, but actually Controlee A and Cloud A can generate values in a complicated way, and since the corresponding algorithm is shared within Vendor A, which is the same manufacturer, it cannot be inferred from the outside through Device Discriminator or Rotating ID and MAC address.

2.5. Device Commissioning Process Through Setup Code Received by Controller B

Figure 11:
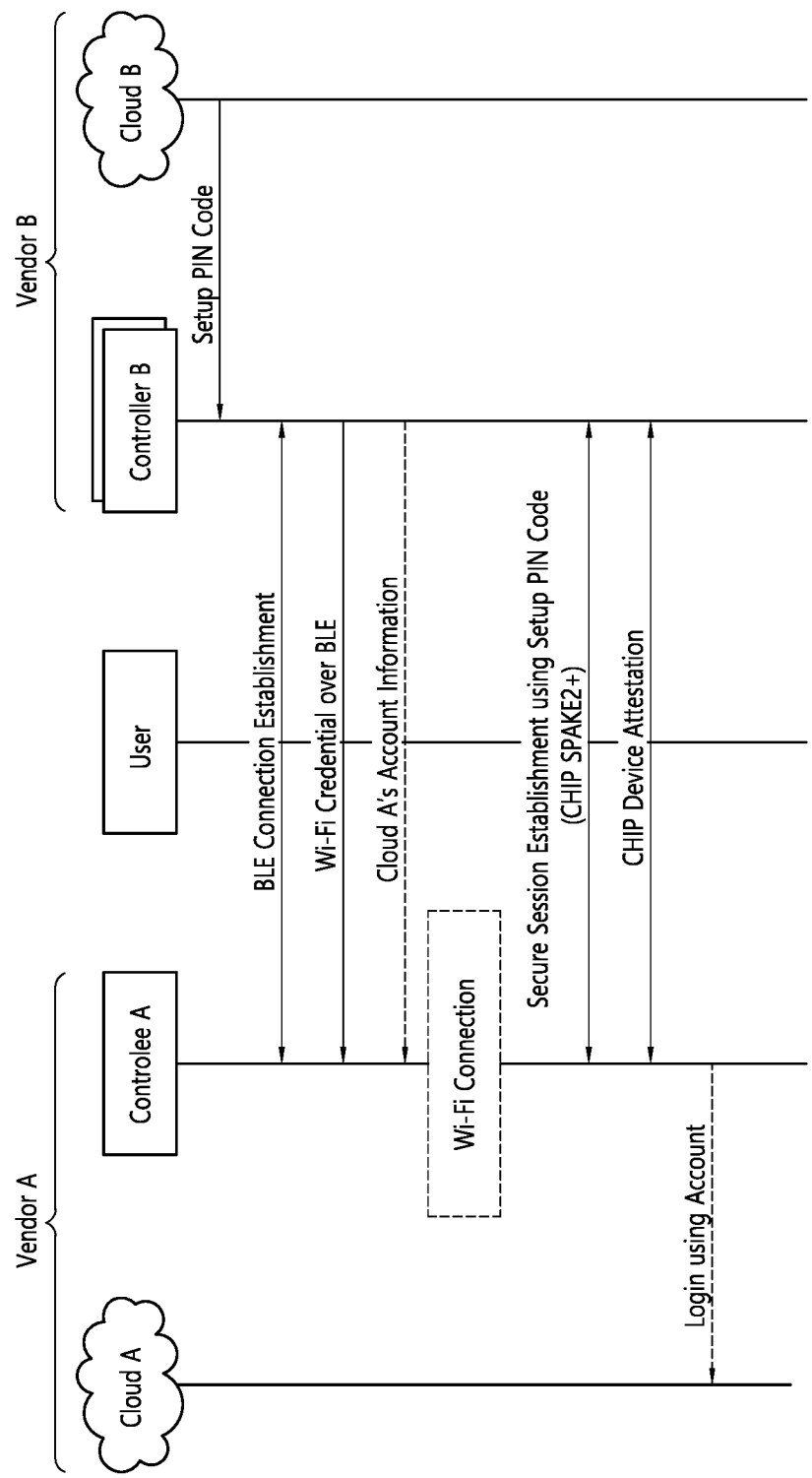
FIG. 11 shows a Wi-Fi connection and commissioning process of a Controlee device.

FIG. 11 shows a Wi-Fi connection and commissioning process of a Controlee device.

FIG. 11 describes a process in which Controller B registers Controlee A as a device through the Setup PIN code acquired through the Proof of Possession process in Section 2.4.

Controller B receives the Setup PIN Code through Cloud B. In the existing CHIP standard, as described in the previous chapter, the corresponding Setup PIN Code can be acquired by Controller B by scanning the QR code of Controlee A, or the user could obtain it by directly entering the 11-digit or 22-digit number written on the Controlee into the Controlee.

After that, Controller B performs BLE Connection through BLE Rendezvous process in the same way as Controlee A and CHIP standard, and Wi-Fi Credential information, which is the information of the AP (Access Point) to which Controller B is connected, is delivered to Controlee A through the corresponding BLE connection.

Also, Controller B can receive Cloud A's account information from Controller B as described in 2.3. Through this information, Controlee A can log in to Cloud A through Cloud URL information, account information, or Access Token, even if it is not the manufacturer's app.

Controlee A, which has obtained the Wi-Fi Credential information, can access the same AP that Controller B connected to based on the information. Then, when connecting a secure session, Controlee A uses the Setup PIN code value it created initially, and Controller B uses the Setup PIN code value received from Cloud B. Since these two values are perfectly identical, a secure session can be connected between them according to the SPAKE2+ algorithm according to the CHIP standard.

After a secure session connection, the CHIP Commissioning process can be completed through device authentication and certificate registration through the device attestation process defined in the CHIP standard.

Hereinafter, the above-described embodiment will be described with reference to FIGS. 1 to 11.

Figure 12:
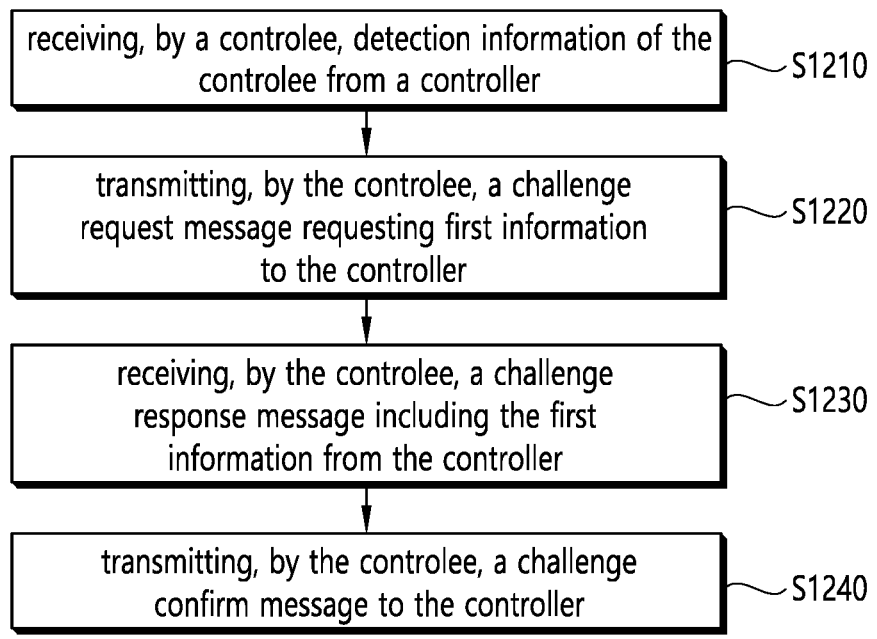
FIG. 12 is a flowchart illustrating a procedure for setting commissioning between an IoT controller and an IoT controlee based on a C2C connection according to the present embodiment.

FIG. 12 is a flowchart illustrating a procedure for setting commissioning between an IoT controller and an IoT controlee based on a C2C connection according to the present embodiment.

This embodiment proposes a method for setting commissioning in local between an IoT controller and an IoT controlee through a cloud-to-cloud (C2C) connection in a smart home environment. To this end, the user performs a proof-of-possession procedure to confirm that the IoT controlee physically belongs to the user. According to the proof-of-possession procedure, the IoT controller can confirm the local presence of the IoT controlee and prevent commissioning of neighboring devices or non-local devices that are searched through BLE. A controller described later may correspond to the IoT controller, and a controlee may correspond to the IoT controlee.

In step S1210, a controlee receives detection information of the controlee from a controller.

In step S1220, the controlee transmits a challenge request message requesting first information to the controller.

In step S1230, the controlee receives a challenge response message including the first information from the controller.

In step S1240, the controlee transmits a challenge confirm message to the controller.

The controlee is connected to the first cloud based on a first account, and the controller is connected to a second cloud based on a second account.

The detection information of the controlee, the challenge request message, the challenge response message, and the challenge confirmation message are transmitted and received based on the connection between the first and second clouds. That is, the information and message may be transmitted and received through a C2C connection (connection between the first cloud of the controlee and the second cloud of the controller) for commissioning between the controlee and the controller.

The first information is a proof of possession value. The challenge confirmation message includes a verification result of the commissioning between the controlee and the controller based on the first information.

That is, the controlee (or the first cloud) may request a proof-of-possession value (four digits) from the controller (or the second cloud). At this time, the second cloud may request the user to input or speak the proof-of-possession value, and the user may input or speak the proof-of-possession value in the controlled device or Application (App) of the controlee. The controller may transmit the proof-of-possession value input from the user to the second cloud, and the second cloud may include the proof-of-possession value input from the user in the challenge response message and transmit it to the first cloud.

The detection information of the controlee may include second and third information. The second information may be a device discriminator (rotating ID) value for identifying the controlee, and the third information may be a Bluetooth Low Energy (BLE) MAC address value of the controlee.

The controlee may generate fourth and fifth information through the first cloud (or, the first cloud may generate the fourth and fifth information). The fourth information may be a setup Personal Identification Number (PIN) code value, and the fifth information may be a device discriminator value calculated by the first cloud.

If the fifth information is identical to the first information, a verification result of commissioning between the controlee and the controller may include the fourth information. That is, as a result of successful verification, the controlee (or the first cloud) may transmit the setup PIN code value to the controller (or the second cloud).

If the fifth information is different from the first information, a verification result for commissioning between the controlee and the controller may include a reason code for verification failure. That is, the controlee (or the first cloud) may notify the controller (or the second cloud) of the verification failure with the reason code.

The controlee may perform a BLE connection with the controller based on the second, fourth, and fifth information. The controlee may receive Wi-Fi credential information of an access point (AP) connected to the controller through the BLE connection from the controller. The controlee may perform a connection with the AP based on the Wi-Fi credential information. The controlee may establish a secure session with the controller based on the fourth information. The controlee may complete the commissioning between the controlee and the controller based on an attestation of the controlee.

A procedure for performing an initialization and search process by applying power to the controlee by the user is as follows.

(When power is applied from the user) The controlee may generate the proof-of-possession value, the device discriminator value, and the setup PIN code value for the commissioning with the controller. The device discriminator value may be generated as a 4-digit number by a random number generator. The setup PIN code value may be generated by the upper 27-bit number of output values of a hash function. The proof-of-possession value may be generated as a lower 12-bit or 13-bit number among the output values of the hash function. An input value of the hash function may be a value in which the device discriminator value and the BLE MAC address value are concatenated.

The controlee may transmit a BLE advertisement message including the device discriminator value to the controller. The controlee may perform a BLE connection with the controller based on the BLE advertisement message. The detection information of the controlee may be obtained by the controller based on the BLE connection. That is, the controller can search for the controlee through the BLE connection, but there is a disadvantage in that the controlee can be searched even if it is not physically local. As described above, according to the proof-of-possession value through the C2C connection, the controller checks the local presence of the controlee and prevents the commissioning of neighboring devices or non-local devices that are searched through BLE.

Also, an account of the first cloud of the controlee may be generated in the second cloud of the controller. The controlee may information on the first account based on the connection between the first and second clouds from the controller. The first account may be a temporary account generated by the second cloud. The first and second accounts may be linked to each other. In this way, cloud-to-cloud communication can be established.

3. Device Configuration

The technical features of the present disclosure may be applied to various devices and methods. For example, the technical features of the present disclosure may be performed/supported through the device(s) of FIG. 1 and/or FIG. 6. For example, the technical features of the present disclosure may be applied to only part of FIG. 1 and/or FIG. 6. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 6. For example, the device of the present specification is a device operating in a wireless LAN system in a smart home environment, and the device includes a memory and a processor operably coupled to the memory, wherein the processor is configured to receive detection information of the controlee from a controller; transmit a challenge request message requesting first information to the controller; receive a challenge response message including the first information from the controller; and transmit a challenge confirm message to the controller.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving detection information of the controlee from a controller; transmitting a challenge request message requesting first information to the controller; receiving a challenge response message including the first information from the controller; and transmitting a challenge confirm message to the controller. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 6. Meanwhile, the CRM of the present disclosure may be the memory 112, 122 of FIG. 1, the memory 620 of FIG. 6, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system of a smart home environment, the method comprising:
receiving, by a controlee, detection information of the controlee from a controller;
transmitting, by the controlee, a challenge request message requesting first information to the controller;
receiving, by the controlee, a challenge response message including the first information from the controller; and
transmitting, by the controlee, a challenge confirm message to the controller,
wherein the controlee is connected to a first cloud based on a first account;
wherein the controller is connected to a second cloud based on a second account,
wherein the detection information of the controlee, the challenge request message, the challenge response message, and the challenge confirmation message are transmitted and received based on the connection between the first and second clouds,
wherein the first information is a proof-of-possession value, and
wherein the challenge confirmation message includes a verification result of commissioning between the controlee and the controller based on the first information.

2. The method of claim 1, wherein the detection information of the controlee includes second and third information,
wherein the second information is a device discriminator or rotating identifier value for identifying the controlee,
wherein the third information is a BLE (Bluetooth Low Energy) MAC address value of the controlee.

3. The method of claim 2, further comprising:
generating, by the controlee, fourth and fifth information through the first cloud,
wherein if the fifth information is identical to the first information, a verification result of commissioning between the controlee and the controller includes the fourth information,
wherein if the fifth information is different from the first information, a verification result for commissioning between the controlee and the controller includes a reason code for verification failure,
wherein the fourth information is a setup Personal Identification Number (PIN) code value,
wherein the fifth information is a device discriminator value calculated by the first cloud.

4. The method of claim 3, further comprising:
performing, by the controlee, a BLE connection with the controller based on the second, fourth, and fifth information;
receiving, by the controlee, Wi-Fi credential information of an access point (AP) connected to the controller through the BLE connection from the controller;
performing, by the controlee, a connection with the AP based on the Wi-Fi credential information;
establishing, by the controlee, a secure session with the controller based on the fourth information; and
completing, by the controlee, the commissioning between the controlee and the controller based on an attestation of the controlee.

5. The method of claim 3, further comprising:
generating, by the controlee, the proof-of-possession value, the device discriminator value, and the setup PIN code value for the commissioning with the controller;
wherein the device discriminator value is generated as a 4-digit number by a random number generator,
wherein the setup PIN code value is generated by an upper 27-bit number of output values of a hash function,
wherein the proof-of-possession value is generated as a lower 12-bit or 13-bit number among the output values of the hash function,
wherein an input value of the hash function is a value in which the device discriminator value and the BLE MAC address value are concatenated.

6. The method of claim 5, further comprising:
transmitting, by the controlee, a BLE advertisement message including the device discriminator value to the controller; and
performing, by the controlee, a BLE connection with the controller based on the BLE advertisement message,
wherein the detection information of the controlee is obtained by the controller based on the BLE connection.

7. The method of claim 1, further comprising:
receiving, by the controlee, information on the first account based on the connection between the first and second clouds from the controller,
wherein the first account is a temporary account generated by the second cloud,
wherein the first and second accounts are linked to each other.

8. A controlee in a wireless local area network (WLAN) system of a smart home environment, the controlee comprising:
a memory;
a transceiver; and
a processor being operatively connected to the memory and the transceiver,
wherein the processor is configured to:
receive detection information of the controlee from a controller;
transmit a challenge request message requesting first information to the controller;
receive a challenge response message including the first information from the controller; and
transmit a challenge confirm message to the controller,
wherein the controlee is connected to a first cloud based on a first account;
wherein the controller is connected to a second cloud based on a second account,
wherein the detection information of the controlee, the challenge request message, the challenge response message, and the challenge confirmation message are transmitted and received based on the connection between the first and second clouds,
wherein the first information is a proof-of-possession value, and
wherein the challenge confirmation message includes a verification result of commissioning between the controlee and the controller based on the first information.

9. The controlee of claim 8, wherein the detection information of the controlee includes second and third information,
- wherein the second information is a device discriminator or rotating identifier value for identifying the controlee,
- wherein the third information is a BLE (Bluetooth Low Energy) MAC address value of the controlee.

10. The controlee of claim 9, wherein the processor is further configured to:
- generate fourth and fifth information through the first cloud,
- wherein if the fifth information is identical to the first information, a verification result of commissioning between the controlee and the controller includes the fourth information,
- wherein if the fifth information is different from the first information, a verification result for commissioning between the controlee and the controller includes a reason code for verification failure,
- wherein the fourth information is a setup Personal Identification Number (PIN) code value,
- wherein the fifth information is a device discriminator value calculated by the first cloud.

11. The controlee of claim 10, wherein the processor is further configured to:
- perform BLE connection with the controller based on the second, fourth, and fifth information;
- receive Wi-Fi credential information of an access point (AP) connected to the controller through the BLE connection from the controller;
- perform a connection with the AP based on the Wi-Fi credential information;
- establish a secure session with the controller based on the fourth information; and
- complete the commissioning between the controlee and the controller based on an attestation of the controlee.

12. The controlee of claim 10, wherein the processor is further configured to:
- generate the proof-of-possession value, the device discriminator value, and the setup PIN code value for the commissioning with the controller;
- wherein the device discriminator value is generated as a 4-digit number by a random number generator,
- wherein the setup PIN code value is generated by an upper 27-bit number of output values of a hash function,
- wherein the proof-of-possession value is generated as a lower 12-bit or 13-bit number among the output values of the hash function,
- wherein an input value of the hash function is a value in which the device discriminator value and the BLE MAC address value are concatenated.

13. The controlee of claim 12, wherein the processor is further configured to:
- transmit a BLE advertisement message including the device discriminator value to the controller; and
- perform a BLE connection with the controller based on the BLE advertisement message,
- wherein the detection information of the controlee is obtained by the controller based on the BLE connection.

14. The controlee of claim 8, wherein the processor is further configured to:
- receive information on the first account based on the connection between the first and second clouds from the controller,
- wherein the first account is a temporary account generated by the second cloud,
- wherein the first and second accounts are linked to each other.

* * * * *